United States Patent [19]

Rogers et al.

[11] Patent Number: 5,351,311
[45] Date of Patent: Sep. 27, 1994

[54] NEURAL NETWORK FOR DETECTION AND CORRECTION OF LOCAL BOUNDARY MISALIGNMENTS BETWEEN IMAGES

[75] Inventors: George W. Rogers, King George; Jeffrey L. Solka, Fredericksburg, both of Va.; Donald Vermillion, Riverdale, Md.; Carey E. Priebe, King George; Wendy L. Poston, Fredericksburg, both of Va.

[73] Assignee: The United States of America as represented by the Secretary of the Navy, Washington, D.C.

[21] Appl. No.: 920,700

[22] Filed: Jul. 28, 1992

[51] Int. Cl.$^5$ .............................................. G06K 9/00
[52] U.S. Cl. ....................................... 382/45; 382/14; 382/44
[58] Field of Search .................... 382/14, 15, 42, 45, 382/44, 48, 49; 395/21; 358/105

[56] References Cited

U.S. PATENT DOCUMENTS

| | | | |
|---|---|---|---|
| 4,204,193 | 5/1980 | Schroeder | 382/45 |
| 4,803,736 | 2/1989 | Grossberg et al. | 382/22 |
| 5,109,425 | 4/1992 | Lawton | 358/105 |
| 5,153,923 | 10/1992 | Matsuba et al. | 382/14 |
| 5,168,530 | 12/1992 | Peregrim | 382/49 |

OTHER PUBLICATIONS

Moura et al., "Edge Detection Through Cooperation and Competition", 1991, pp. 2588-2593.
Invariant Recognition of Cluttered Scenes by a Self-Organizing ART Architecture: CORT-X Boundary Segmentation by Gail A. Carpenter, Stephen Grossberg, and Courosh Mehanian, (1988), pp. 169-176.

Aggregating Signals From: Analog VLSE and Neural Systems by Carver Mead, Addison-Wesley, (1989).

*Primary Examiner*—Stephen Chin
*Assistant Examiner*—Timothy J. May
*Attorney, Agent, or Firm*—Jacob Shuster

[57] ABSTRACT

A network is provided for the detection and correction of local boundary misalignments in a two-dimensional pixel space between a reference and transformed image. An input layer has input layer sections, each of which contains a plurality of input nodes associated with a cell. The cell is centered on a pixel and divided along a straightline orientation into first and second cell sections. Each of the input nodes outputs a digital signal indicative of the presence or absence of a contrast gradient as measured by the two cell sections. A second layer has a plurality of second layer sections, each of which is associated with one of the input layer sections and contains a plurality of second layer nodes. Each second layer node is responsive to a combination of input nodes to indicate the presence or absence of a boundary misalignment between the reference and transformed images. Presence of a contrast gradient at the combination of nodes defines a local boundary misalignment. A third layer has a plurality of third layer nodes, each of which is associated with one of the second layer sections. Each third layer node weights and combines outputs of the second layer nodes to output a signal defining a direction to shift the transformed image perpendicular to the straightline orientation. The third layer are outputs a signal defining the local correction of the local boundary misalignment between the reference and transformed images for the centered pixel.

9 Claims, 5 Drawing Sheets

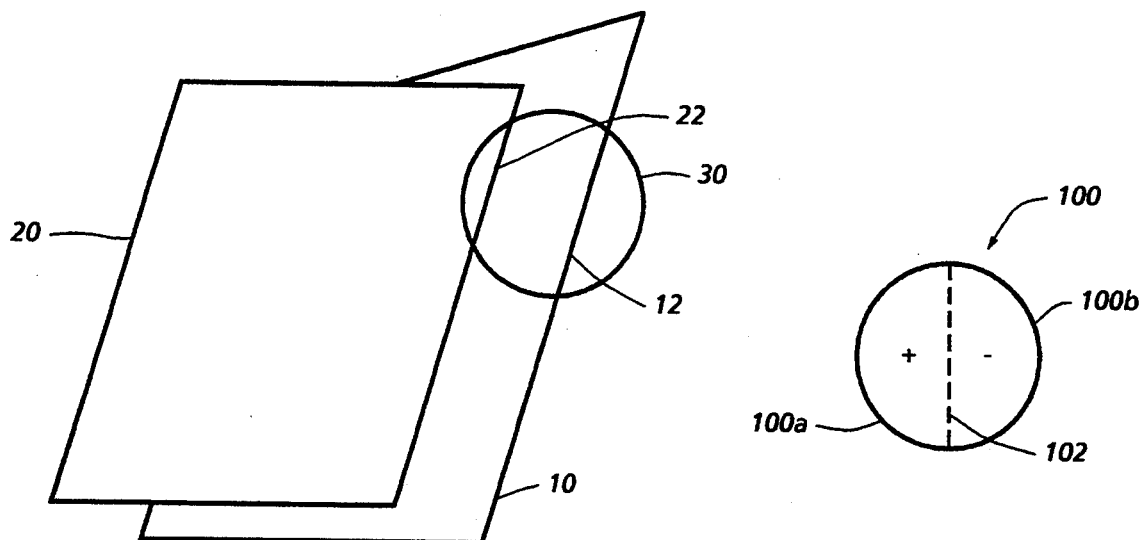
FIG. 1
FIG. 2
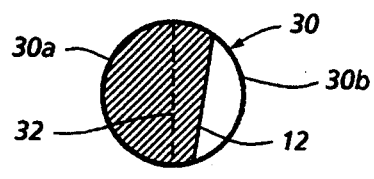
FIG. 4a
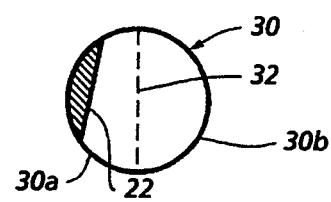
FIG. 4b
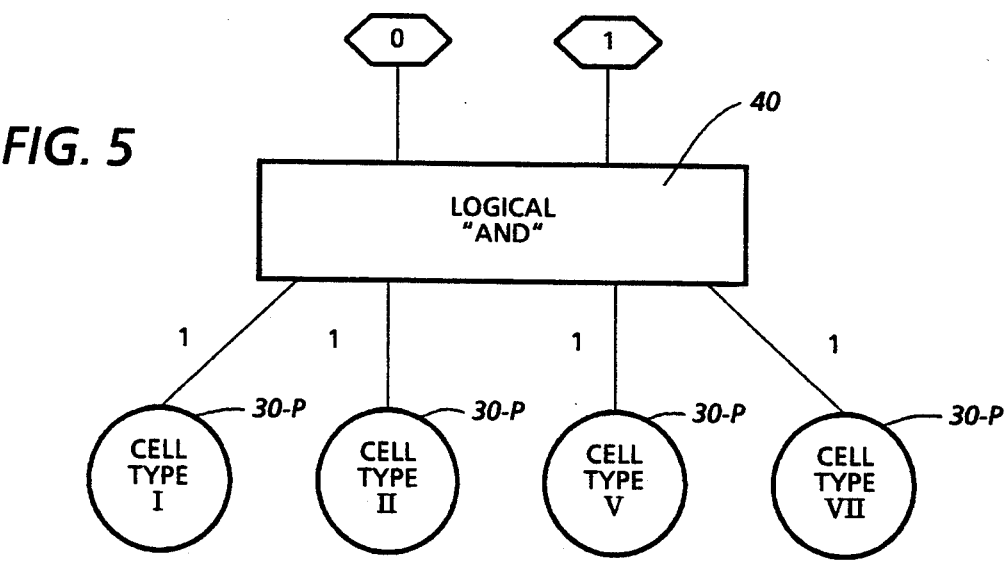
FIG. 5

0°

45°

90°

135°

NEURAL NETWORK FOR DETECTION AND CORRECTION OF LOCAL BOUNDARY MISALIGNMENTS BETWEEN IMAGES

ORIGIN OF THE INVENTION

The invention described herein was made in the performance of official duties by employees of the Department of the Navy and may be manufactured, used, licensed by or to the Government for any governmental purpose without payment of any royalties thereon.

FIELD OF THE INVENTION

The invention relates generally to artificial neural networks, and more particularly to an artificial neural network that provides for the detection and correction of local boundary misalignments between two monochrome images.

BACKGROUND OF THE INVENTION

Artificial neural networks are powerful information processors conceptually based on the field of neurobiology as is well known in the art. Such networks strive to simulate biological neural network functions in computer architectures. In other words, an artificial neural network must correlate a wide variety of inputs to produce an output. One such biological neural network function is that of image or pattern recognition. While image recognition covers a variety of applications, several will be described briefly in order to highlight problems associated therewith. The applications include satellite image registration, digital scene correlation for autonomous vehicle positional updates and the air reconnaissance six degree of freedom object identification problem.

Satellite images are used extensively in both civilian and military applications. Individual satellite images must be correlated or registered with one another in order to provide a coherent image of an area of interest. For example, one image of an area may be obstructed in one portion thereof while a second later image may be obstructed in another portion thereof as the satellite orbits the earth. It may be necessary to use several images of an area of interest to piece together one coherent image free from any obstructions. Unfortunately, as each individual image is overlaid on top of one another, boundaries of objects and obstructions within the area of interest do not line up from one image to the next. Accordingly, the image registration problem must be solved in order to align the boundaries of the objects to generate a coherent satellite image.

Autonomous vehicle (e.g. robots, missiles, etc.) positional updates typically rely on comparing the actual image of an area being traversed with a reference image of the area. Unfortunately, the autonomous vehicle is frequently on a course whereby the actual image is formed at an angle with respect to the angle used to generate the reference image. It is thus necessary to rotate the actual image to match the reference image in order for the vehicle to update its position. This problem is known as digital scene correlation. Accordingly, it becomes necessary to correlate the actual image so that it is aligned with the reference image.

Air reconnaissance for purposes of ground object identification typically compares an actual image of a ground object with a database of reference models in order to classify the ground object. Unfortunately, the angle and distance of the reconnaissance aircraft causes the actual image of the ground object to be distorted in size and/or shape with respect to the reference models. This distortion may occur in any one or more of six degrees of freedom. In order to classify the ground object, it becomes necessary to maximally align the actual image (which has undergone an unknown affine transformation) with one of the reference models. However the aforementioned size and/or shape distortions result in boundary misalignments between the actual image and reference models.

SUMMARY OF THE INVENTION

Accordingly, it is an object of the present invention to provide an artificial neural network that provides for the local detection and correction of boundary misalignments between two monochrome images.

Another object of the present invention is to provide an artificial neural network that detects boundary misalignments between a reference image of an object and an actual image of the object that has been distorted or transformed due to translation, scaling and/or in-plane rotation along two axes.

Yet another object of the present invention is to provide an artificial neural network that provides for the local detection and correction of boundary misalignments between two images that may be implemented using known types of neural processors and resistive grid networks.

Other objects and advantages of the present invention will become more obvious hereinafter in the specification and drawings.

In accordance with the present invention, a neural network is provided for the detection and correction of local boundary misalignments in a two-dimensional pixel space between a monochrome reference image and a monochrome transformed image. The transformed image is related to the reference image by an unknown transformation. The reference and transformed images are defined within a given pixel space. The neural network is defined at each pixel in the given pixel space. An input layer has at least two input layer sections, each of which contains a plurality of input nodes associated with a cell defining a field of view in the given pixel space. The cell is i) centered on a pixel within the field of view and ii) divided through the centered pixel along a predetermined straightline orientation into first and second cell sections. Each input layer section is associated with a unique predetermined straightline orientation. Each of the input nodes associated with the cell is a processor for measuring one of eight contrast gradients. A contrast gradient measurement is defined as a difference in image intensity between two cell sections. The two cell sections are selected from the group consisting of i) the first and second cell sections viewed with respect to only the reference image, ii) the first and second cell sections viewed with respect to only the transformed image, iii) the first cell sections viewed with respect to the reference and transformed images, and iv) the second cell sections viewed with respect to the reference and transformed images. Each of the input nodes associated with the cell outputs a digital signal indicative of one of a presence or absence of a contrast gradient as measured by the selected two cell sections. A second layer has a plurality of second layer sections. Each second layer section is associated with one of the input layer sections and contains a plurality of second layer nodes. Second layer nodes are responsive to the outputs of a predetermined combination of the input nodes associated with the cell to output a signal indicative of a presence or absence of a boundary misalignment between the reference and transformed images in the field of view defined by the cell. The presence of a contrast gradient on all of the outputs of the predetermined combination is indicative of the presence of a boundary misalignment. A third layer has a plurality of third layer nodes, each of which is associated with one of the second layer sections and is responsive to the outputs of the second layer nodes associated therewith. Each third layer node weights and combines the outputs of the second layer nodes associated therewith to output a signal indicative of a direction to shift the transformed image perpendicular to the predetermined straightline orientation. The outputs of the third layer are weighted and averaged to output a signal indicative of the local correction of the boundary misalignment between the reference and transformed images for the centered pixel.

BRIEF DESCRIPTION OF THE DRAWINGS

FIG. 1 depicts a reference image and transformed copy thereof in relationship to one another in a common pixel space;

FIG. 2 is an isolated view of a typical simple cell used in the processing method of the present invention;

FIG. 4(a) is an example of a simple processing cell viewed with respect to the reference image;

FIG. 4(b) is an example of the same simple cell as in FIG. 4(a) but viewed with respect to the transformed image;

FIG. 5 is a neural network embodiment of a complex cell according to the present invention;

DETAILED DESCRIPTION OF THE INVENTION

Figure 3A:
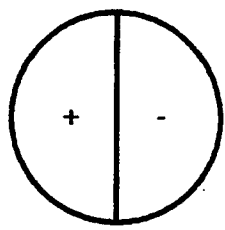
FIG. 3(a)-3(h) depict the eight fundamental types of local arrangements of simple cell processors used in processing a monochrome image in two-dimensional space.
Figure 3B:
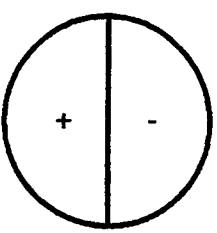
Figure 3C:
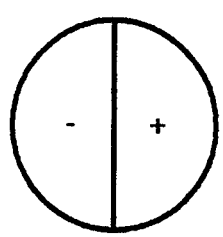
Figure 3D:
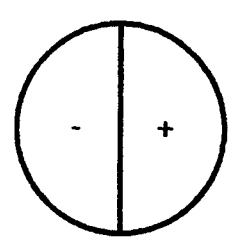
Figure 3E:
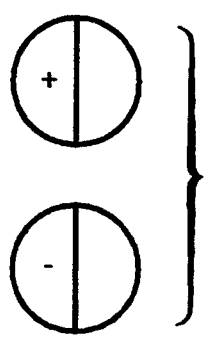
Figure 3F:
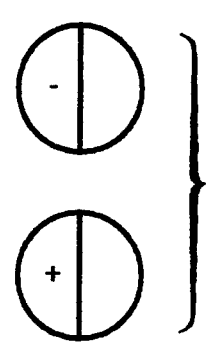
Figure 3G:
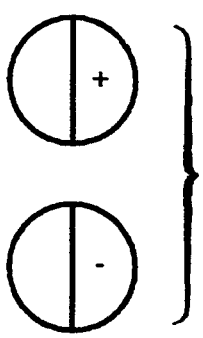
Figure 3H:
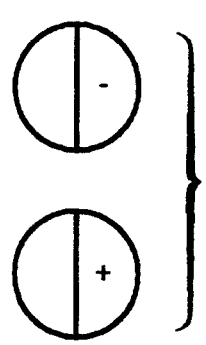

Referring now to the drawings, and more particularly to FIG. 1, a reference image 10 and transformed copy thereof, designated by reference numeral 20, are shown as they would appear in a given pixel space. As is readily apparent, transformed image 20 is distorted and shifted relative to reference image 10 when viewed in the given pixel space. Accordingly, FIG. 1 will be used to describe the generic misalignment problem between two monochrome images defined in a given two-dimensional space. Since transformed image 20 may be obtained by the application of an affine transformation, aligning transformed image 20 with reference image 10 involves recovering the two-dimensional affine transformation. However, to solve the generic misalignment problem, one must be able to compute local misalignments between reference image 10 and transformed image 20.

One such local misalignment is contained within the local field of view bounded by the circle indicated by reference numeral 30. A reference image boundary 12 and a transformed image boundary 22 are contained within the confines of local field of view 30. In terms of a video image, local field of view 30 bounds at least one pixel and typically encompasses a plurality of pixels. For purposes of the present invention, local field of view 30 may be thought of as a simple cell (as it will be referred to hereinafter) that is sensitive to image gradients across cell 30. This type of cell has been previously described in detail as part of boundary detection/completion systems by Carpenter et al. in "Invariant Recognition of Cluttered Scenes by a Self-Organizing ART Architecture: CORT-X Boundary Segmentation, Neural Networks, Volume 2, 1989, pg, 169-181. However, in order to facilitate a more complete understanding of the present invention, a brief description of simple cell processing will follow.

Since the images of concern are monochrome, the pixels within a simple processing cell will be either "on" or "off". A typical cell 100 is shown in isolation in FIG. 2. Cell 100 is divided into two sections 100a and 100b along a line of orientation 102. The output of simple cell 100 is either a binary "0" or "1" depending on the difference in the number of pixels "on" or "off" in each section of the cell. Since section 100a is designated as "+", a binary "1" is output from cell 100 whenever section 100a has more pixels "on" than section 100b. Alternatively, cell 100's output could be conditioned to fire when section 100a has some predetermined number N more pixels "on" than section 100b. Cell sensitivity is perpendicular to the line of orientation 102.

Typically, cell 100 is centered on a pixel (not shown) and is divided in half as shown although there is no requirement to do so. Cell 100 is shown as being circular. However, the shape (and size) of cell 100 (e.g. cell 30 or any other cell) are design considerations based on resolution and processing speed requirements that in no way impact the novel aspects of the present invention.

In general, each simple cell is fixed within the given pixel space in which the reference and transformed images appear. One or both sections of a simple cell may reside wholly or partially (i.e., indicating the presence of a boundary) within the reference or transformed imaaes. Whenever a boundary is encountered, the boundary in the cell as viewed from the transformed image may be misaligned when compared with the boundary in the cell as viewed from the reference image. These aforementioned principles are applied in the design and operation of the present invention as will now be described.

In two-dimensional space, there are eight fundamental types of local arrangements of simple cell processors as shown in FIGS. 3(a)-3(h). Types I-IV in FIGS. 3(a)-3(d) look at the associated cell with respect to one image (e.g. Type I looks at the reference image) to detect the difference in pixels "on" or "off" for each section of the cell according to cell sensitivity (i.e., the "+" and "−" designations). Accordingly, cell types I-IV are known as homogenous cells. Types V-VIII respectivley shown in FIGS. 3(e)-3(h) check the same cell section for both the reference and transformed images and can detect the differences in pixels "on" or "off" between the same section of the reference and transformed images. Determination of the output signal generated by each of the eight processor types is best understood by way of example.

Accordingly, FIGS. 4(a) and 4(b) show simple cell 30 from FIG. 1 in isolation. In FIG. 4(a), cell 30 is shown as viewed with respect to reference image 10, while cell 30 is shown as viewed with respect to transformed image 20 in FIG. 4(b). In both cases, cell 30 is divided in half into sections 30a and 30b along a line of orientation 32. Note that reference image boundary 12 appears in section 30b while transformed image boundary 22 appears in section 30a. Since section 30a in FIG. 4(a) has more pixels "on" than section 30b, if cell 30 in FIG. 4(a) were configured as a Type I processor, it would output a binary "1". However, if FIG. 4(a) were configured as a Type III processor, it would output a binary "0". In a similar fashion, section 30a in FIG. 4(b) has more pixels "on" than section 30b. Thus, if cell 30 in FIG. 4(b) were configured as a Type II processor it would output a binary "1". However if cell 30 in FIG. 4(b) were configured as a Type IV processor, it would output a binary "0". For the heterogeneous processors, Types V and VII would output a binary "1" while Types VI and VIII would output a binary "0" when applied to the local cells shown in FIGS. 4(a) and 4(b). From the above, it is readily apparent that for any given local misalignment (that does not fall directly on the line of orientation), four of the eight types of processors will output a binary "1" and four will output a binary "0".

A neural network embodiment of the example of FIGS. 4(a) and 4(b) is shown in FIG. 5 where simple processors associated with cell 30 are designated by reference numeral 30-P. A complex cell 40 logically AND'S the outputs of four types (Types I, II, V and VII for the example being described) of simple cell processors 30-P. Thus, if the response from complex cell 40 is a binary "1", this is an indication that a correction is needed in order to improve the alignment of the transformed image with respect to the referenced image along the line of the cell's sensitivity. Complex cell 40, as applied to FIGS. 4(a) and 4(b), detects only horizontal orientation misalignments, i.e., perpendicular to the line of orientation 32 in this example.

Figures 6A, 6B, 6C, 6D:
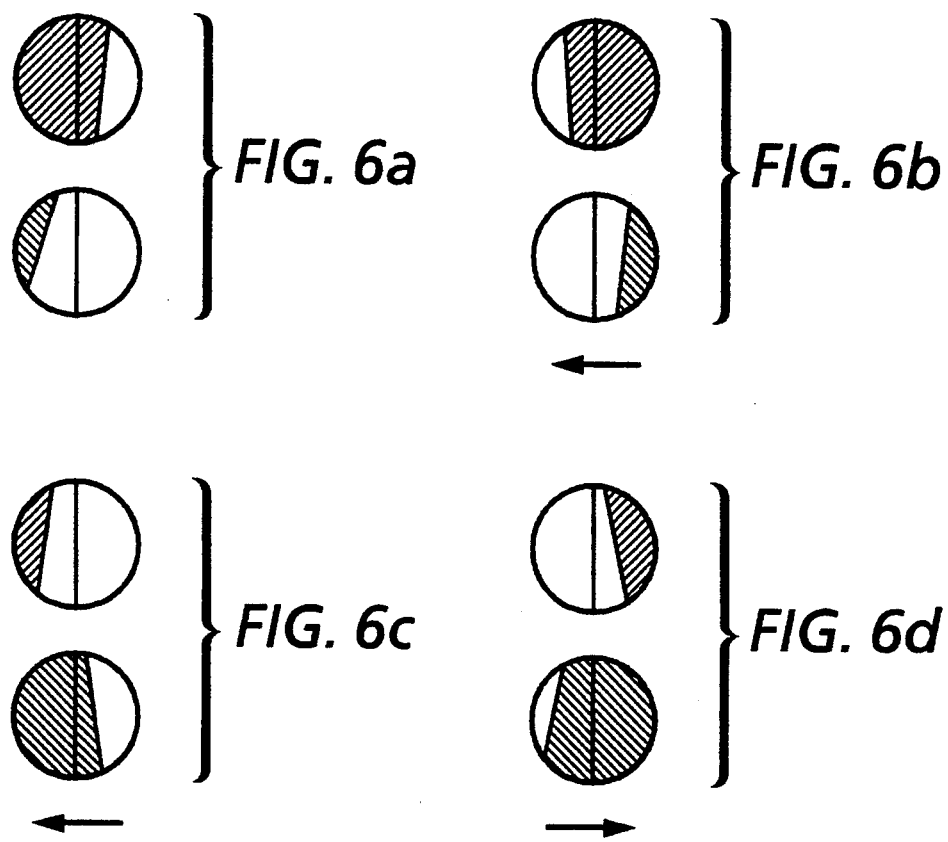
FIGS. 6(a)-6(d) show the four possible complex cells required for each cell line of orientation.

Furthermore, in two-dimensional space, there are four possible ways that the reference and transformed images can be considered misaligned along a given line of orientation. The four possible misalignment situations requiring a complex cell for horizontal misalignments are shown in FIGS. 6(a)-6(d) where the top simple cell is viewed with respect to the reference image and the bottom simple cell is viewed with respect to the transformed image. Note that the first complex cell shown in FIG. 6(a) is the local boundary misalignment case shown in FIG. 1. The hatched portion in each cell is indicative of the reference or transformed image.

Figure 7:
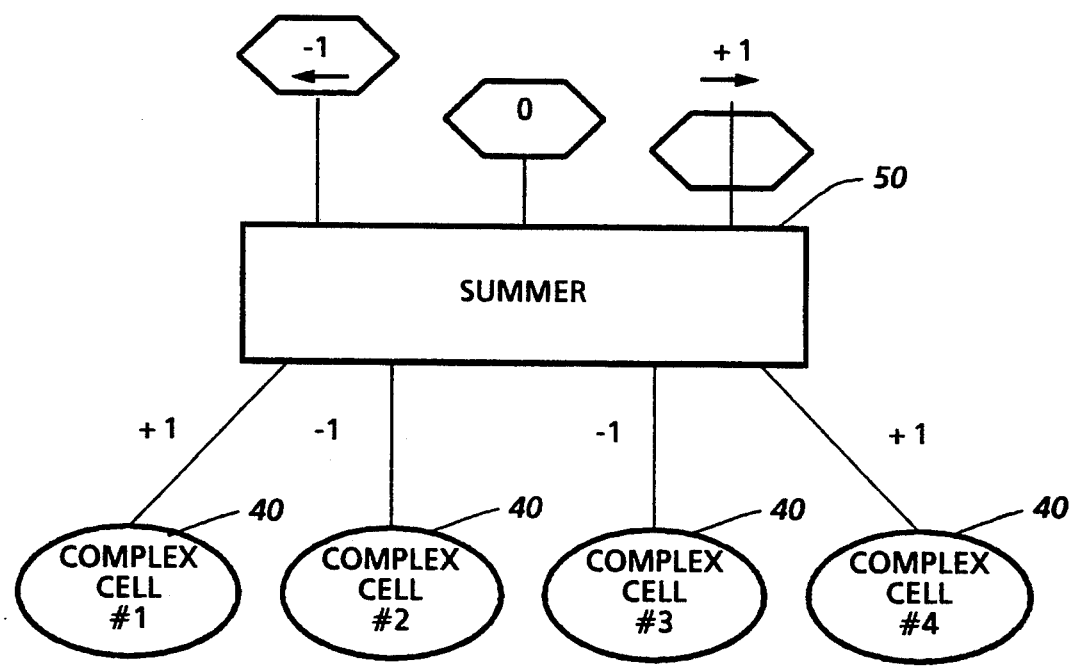
FIG. 7 is the neural network embodiment of the summer used to combine four complex cells associated with a particular cell line of orientation.

Each complex cell is indicative of a direction of correction as indicated by the arrows below each complex cell. The complex cells have connection strengths of ±1 depending on the direction of correction needed, e.g., +1 indicating correction to the right and −1 indicating correction to the left in the case of horizontal misalignments. The outputs generated by each complex cell must be processed to indicate the appropriate direction of correction. A neural network embodiment of this processing is shown in FIG. 7 where the outputs from four complex cells 40 are appropriately weighted and summed at a summer 50. The net output of summer 50 indicates not only whether a local correction is needed perpendicular to the associated line of orientation, but also the direction of the correction. Note that an output of binary "0" indicates that no correction is necessary for the associated line of orientation.

In order to detect other directions of misalignment (including those that may be collinear with respect to a given line of orientation), it is necessary to provide at least one additional set of processors configured such that cell 30 would be viewed along a different, non-collinear line of orientation (i.e., cell sensitivity). In general for each non-collinear line of orientation, given combinations of processor types can be used to detect a local boundary misalignment and a line of correction that is perpendicular to an associated line of orientation.

Figure 8:
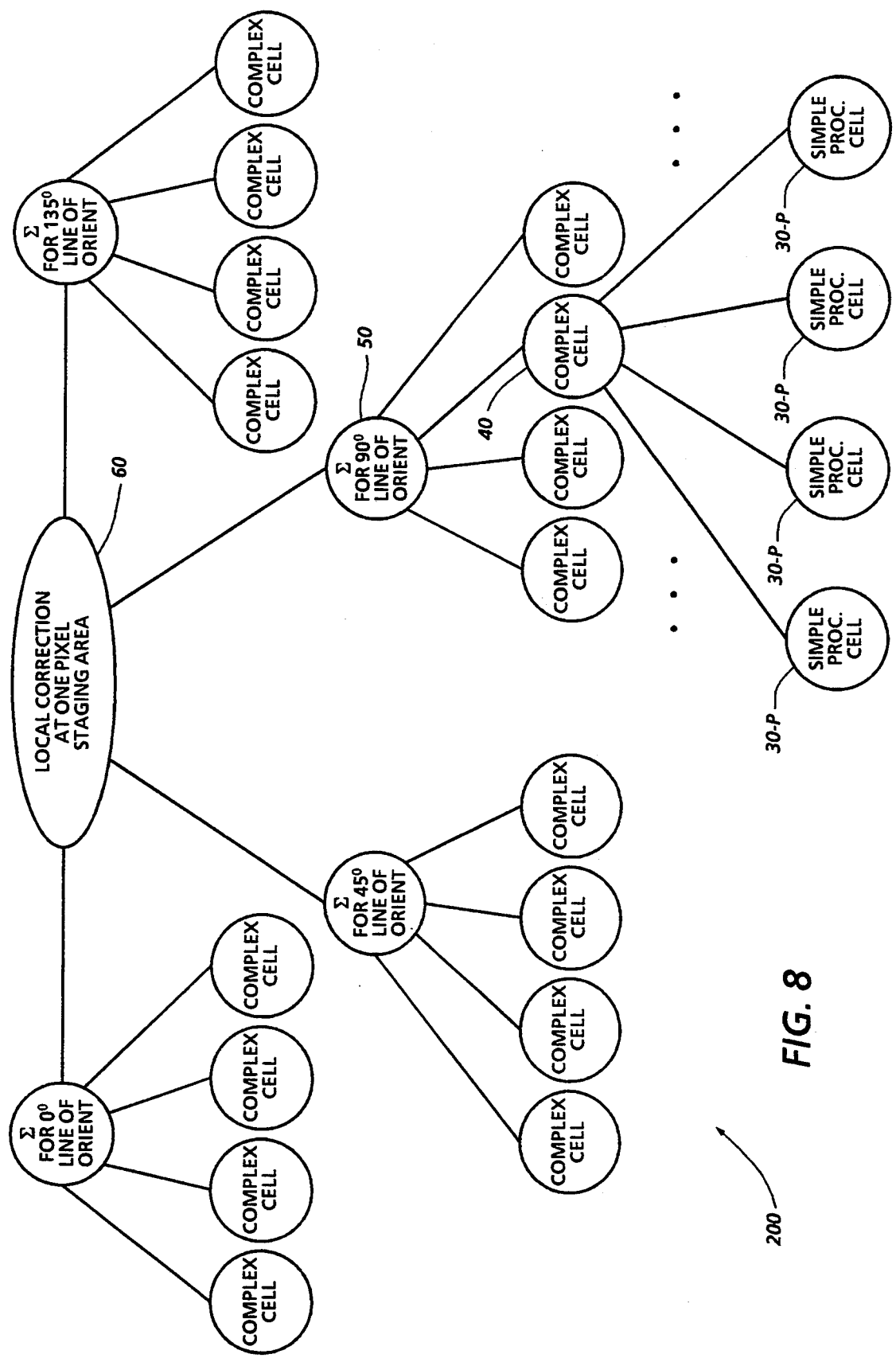
FIG. 8 is a neural network embodiment for detecting and correcting local boundary misalignments for four non-collinear lines of orientation according to the present invention.
Figure 9A:
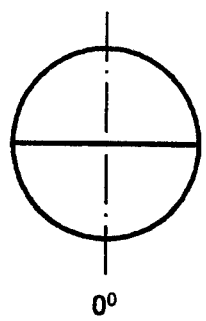
FIGS. 9(a)-9(d) show a set of four simple cells having lines of orientation at 0°, 45°, 90° and 135°.
Figure 9B:
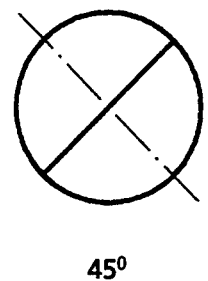
Figure 9C:
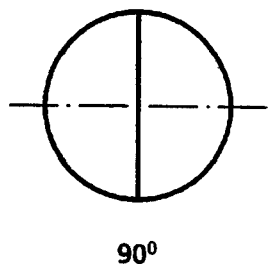
Figure 9D:
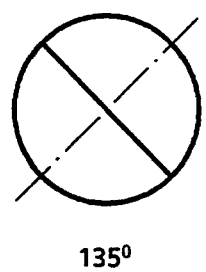

As mentioned above, more than one non-collinear line of orientation is needed to properly align the transformed image with the reference image. By way of example, FIG. 8 depicts a multi-layer neural network 200 for the detection and correction of local boundary misalignments between two such images at a pixel in the center of a selected cell. In order to simplify the description of neural network 200, elements that are common to previously described elements will be identified with common numerals. Neural network 200 is designed to handle four non-collinear lines of orientation. One such set of simple cells and associated lines of orientation could include lines of orientation at 0°, 90°, and 135° as shown in FIGS. 9(a-9(d). Associated lines of correction, as indicated by the dashed line through each cell are perpendicular to the associated lines of orientation. However, it is to be understood that the present invention is not limited to four lines of orientation or these particular orientations.

Referring again to FIG. 8, neural network 200 will be explained with respect to the set of nodes or processors associated with the 90° line of orientation example used above. At its input layer, a combination of four simple processing cells 30-P are input to a complex cell AND circuit 40 residing on the network's second layer. As explained above, four simple cells are required for the formation of each complex cell for a two-dimensional monochrome image. Since four complex cells are required for sensitivity to misalignment for any one line of orientation, sixteen simple cells or input nodes are required for each line of orientation. The output of complex cell 40, along with the three other complex cells required for the 90° line of orientation as described above, is appropriately weighted and summed at summer 50 on the network's third layer. The output of summer 50, along with the summer's associated with the three other lines of orientation, are stored in a staging area 60 to form the local gradient or correction at the one pixel on which cell 30 is centered.

Figure 10:
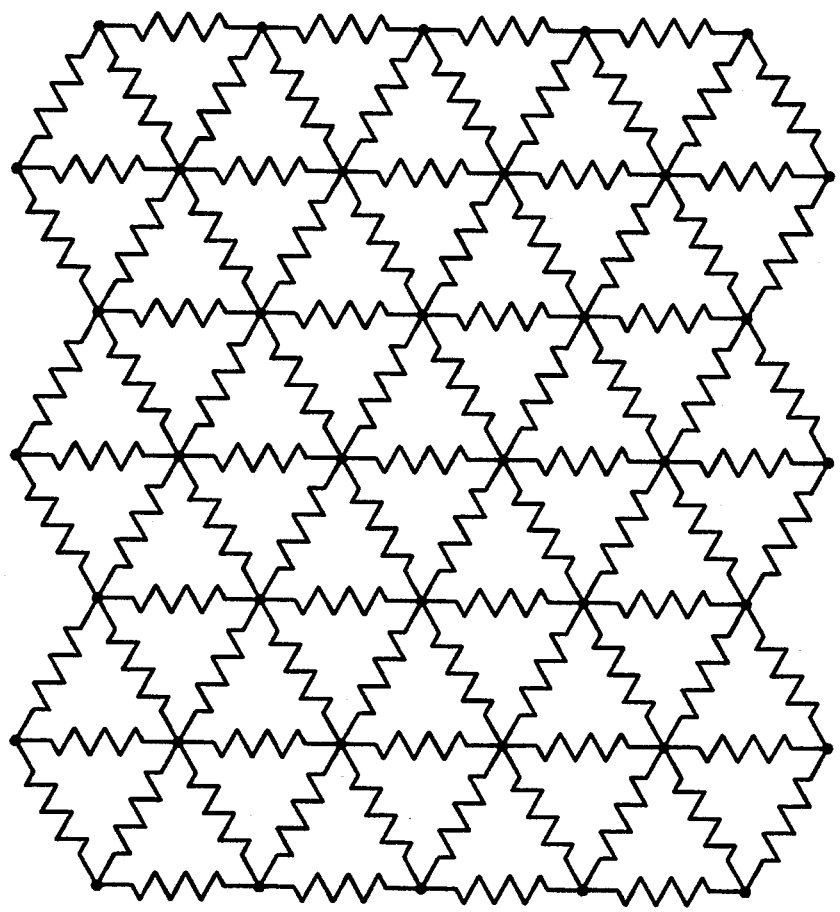
FIG. 10 is an example of a resistive grid network used in the neural network of the present invention.

The local corrections may then be further input to a resistive grid (not shown) to calculate global misalignment between the transformed image and reference image. Resistive grid networks are well known in the art and are described by Mead et al., *Analog VLSI and Neural Systems*, Addison-Wesley, 1989. By way of example, one such resistive grid network is shown in FIG. 10. Processing through multi-layer neural network 200 is carried on in parallel for each of the four lines of orientation. The entire parallel processing continues until the transformed and reference imames align, thereby indicating that the transformation relating the two images is recovered.

The advantages of the present invention are numerous. The neural network described herein determines local misalignments between a transformed and reference image.. The network architecture combines four types of simple processors into complex cells based on the type of boundary mismatch between the images. The network fuses the four complex cell activities required for each cell line of orientation to produce four local corrections at each cell in the image. The four local corrections for each (i.e., at least two) cell line of orientation are averaged by a resistive grid network to generate a pixel correction for the one pixel centered in the cell. The network is operated in an iterative manner to recover the transformation relating the transferred image to the reference image. The network architecture is suitable for a parallel hardware architecture thereby decreasing the processing time required to determine local boundary misalignments and correction thereof.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A neural network for correction of boundary misalignments between a monochrome reference image and a monochrome transformed image that is related to the reference image by an unknown transformation, the reference and transformed images further being defined within a given pixel space wherein, for each pixel in the given pixel space, the neural network comprises: an input layer having a plurality of input laver sections, each of the input layer section containing a plurality of input nodes encompassing at least one pixel within the given pixel space divided along a predetermined orientation into first and second sections of a cell; each of said input nodes having, processor means for detecting a unique contrast gradient defined by a digital state comparison between the pixels of the cell sections selected from a group consisting of: i) the first and second sections viewed with respect to only the reference image, ii) the first and second sections viewed with respect to only the transformed image, iii) the first sections viewed with respect to the reference and transformed images, and iv) the second sections viewed with respect to the reference and transformed images, wherein each of said input nodes outputs a first signal defining one of a presence or absence of the detected contrast gradient as measured by the selected cell sections; a second layer having a plurality of second layer sections respective associated with one of said input layer sections and containing a plurality of second layer nodes respectively responsive to the outputs of a predetermined combination of said input nodes to output a second signal defining a local boundary misalignment between the reference and transformed images when said first signal from each of said input nodes defines the presence of the measured contrast gradient; a third layer having a plurality of third layer nodes respectively associated with one of said second layer sections and responsive to the outputs thereof for weighting and combining the outputs of said associated second layer nodes to output a local correctional signal defining a direction to shift the transformed image perpendicular to the predetermined orientation associated with said one of said input layer sections; and means weighting and averaging the local correctional signal outputs of said third layer for calculating a fourth signal defining global misalignment between the reference and transformed images of the given pixel space.

2. A neural network as in claim 1, wherein each of said second layer nodes comprises a logical AND circuit.

3. A neural network as in claim 1, wherein each of said third layer nodes comprises a summing circuit.

4. A neural network as in claim 1, wherein said means for weighting and averaging the local correctional signal outputs comprises a resistive grid network.

5. The neural network as defined in claim 1 wherein each of the input layer sections is centered on said one of the pixels along one of the predetermined orientations as a straightline.

6. A neural network as in claim 5, wherein the predetermined straightline orientations have relative orientations of 0°, 45°, 90° and 135°, respectively.

7. A neural network as in claim 5, wherein said processor means is sensitive to the unique contrast gradients said comprises four homogeneous processors and four heterogeneous processors.

8. The neural network as defined in claim 1 further including means connected in parallel to the third layer nodes for storing the local correctional signal outputs respectively corresponding to the predetermined orientations of the input layer sections and supplying the same to the weighting and averaging means.

9. In a system for correction of localized and global boundary misalignments between reference and transformed images the reference and the transformed images further being defined within a given pixel space; a neural network having an input means for detecting contrast gradients corresponding to said reference and said transferred image; a processing means connected to the input means for determining the localized boundary misalignment from said contrast gradients; and means connected to the processing means of the neural network for calculating the global boundary misalignments from the determined localized boundary misalignments; the input means including a plurality of cells, each of said cells being divided into first and second cell sections, the contrast gradients being defined by comparison between the pixels in pairs of the cell sections selected from a group consisting of: (i) the first and second sections of the cells viewed with respect to only the reference images thereof, (ii) the first and second sections of the cells viewed with respect to only the transformed images thereof, (iii) the first section of the cells viewed with respect to the reference and transformed images thereof, and (IV) the second sections of the cells viewed with respect to the reference and transformed images thereof.

* * * * *